United States Patent
Murashima et al.

(10) Patent No.: US 11,977,467 B2
(45) Date of Patent: May 7, 2024

(54) SIMULATION DEVICE

(71) Applicant: Hitachi Automotive Systems, Ltd., Hitachinaka (JP)

(72) Inventors: Yasunori Murashima, Hitachinaka (JP); Yuji Fukushima, Hitachinaka (JP); Fumio Narisawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 672 days.

(21) Appl. No.: 16/972,150

(22) PCT Filed: Apr. 24, 2019

(86) PCT No.: PCT/JP2019/017346
§ 371 (c)(1),
(2) Date: Dec. 4, 2020

(87) PCT Pub. No.: WO2019/244472
PCT Pub. Date: Dec. 26, 2019

(65) Prior Publication Data
US 2021/0240592 A1    Aug. 5, 2021

(30) Foreign Application Priority Data
Jun. 22, 2018  (JP) ................... 2018-118735

(51) Int. Cl.
*G06F 11/34*   (2006.01)
*G06F 11/36*   (2006.01)

(52) U.S. Cl.
CPC ...... *G06F 11/3457* (2013.01); *G06F 11/3419* (2013.01); *G06F 11/3636* (2013.01); *G06F 2201/865* (2013.01)

(58) Field of Classification Search
CPC ............. G06F 11/3457; G06F 11/3419; G06F 11/3636; G06F 2201/865
See application file for complete search history.

(56) References Cited

U.S. PATENT DOCUMENTS

2014/0101636 A1* 4/2014 Correll ................. G06F 8/34
                                                        717/113
2018/0039242 A1* 2/2018 Higuchi ................. G05B 17/02

FOREIGN PATENT DOCUMENTS

JP      H05-282160 A      10/1993
JP      2007233675 A  *   9/2007
(Continued)

OTHER PUBLICATIONS

Araki, D., & Takamizawa, H. (Nov. 2009). Co-simulation of multi-ECU hardware/software system using timing back-annotation method. In 2009 International SoC Design Conference (ISOCC) (pp. 380-383). IEEE. (Year: 2009).*

(Continued)

*Primary Examiner* — Eunhee Kim
(74) *Attorney, Agent, or Firm* — Foley & Lardner LLP (57) ABSTRACT

An object of the present invention is to provide a simulation device having a function of adding delay processing for making an execution timing of a personal computer (PC) simulation environment close to that of an actual electronic control unit (ECU). There is provided a simulation device for converting application software into an execution code, verifying the execution code, and porting the verified execution code to another computer device, wherein the simulation device adjusts an execution timing in the other computer device by performing time adjustment processing at the time of starting or ending a function in function units of a source code of an application.

7 Claims, 12 Drawing Sheets

(56) References Cited

FOREIGN PATENT DOCUMENTS

| JP | 2012-203845 | A | | 10/2012 |
|---|---|---|---|---|
| JP | 2012203845 | A | * | 10/2012 |
| JP | 5542643 | B2 | * | 7/2014 |
| JP | 2015-170081 | A | | 9/2015 |

OTHER PUBLICATIONS

Razaghi, P., & Gerstlauer, A. (Jan. 2012). Automatic timing granularity adjustment for host-compiled software simulation. In 17th Asia and South Pacific Design Automation Conference (pp. 567-572). IEEE. (Year: 2012).*

Zhang, Zhenkai, Joseph Porter, Emeka Eyisi, Gabor Karsai, Xenofon Koutsoukos, and Janos Sztipanovits. "Co-simulation framework for design of time-triggered cyber physical systems." In Proceedings of the ACM/IEEE 4th International Conference on Cyber-Physical Systems, pp. 119-128. 2013. (Year: 2013).*

Yi Y, Kim D, Ha S. Virtual synchronization technique with OS modeling for fast and time-accurate cosimulation. InProceedings of the 1st IEEE/ACM/IFIP international conference on Hardware/software codesign and system synthesis Oct. 1, 2003 (pp. 1-6). (Year: 2003).*

International Search Report with English translation and Written Opinion issued in corresponding application No. PCT/JP2019/017346 dated Aug. 27, 2019.

* cited by examiner

```
int main()                void func1()
{                        ↗{
    ...                      ...
    func1();                }
    ...
}
```

FIG. 5

| FUNCTION NAME | Prologue/ Epilogue | CALLING FUNCTION NAME | DELAY COEFFICIENT | REMARKS |
|---|---|---|---|---|
| main ~202 | Prologue | NONE | 0 | TIMING ADJUSTMENT IS NOT REQUIRED AT TIME OF STARTING main FUNCTION |
| func1 ~203 | Prologue | Main | 5 | SINCE ACCESS TO EXTERNAL RAM IS FREQUENT IN PROCESSING AT TIME OF STARTING Main FUNCTION, DELAY COEFFICIENT IS INCREASED |
| (Default) ~201 | (Default) | --- | 3 | IN CASE WHERE THERE IS NO SPECIAL NOTE, DELAY COEFFICIENT IS SET FROM RATIO OF NUMBER OF CPU CLOCKS BETWEEN ACTUAL ECU AND PC. |

| SAMPLE TASK NAME | PRIORITY |
|---|---|
| A | 1 (LOW) |
| B | 2 (HIGH) |

| EXECUTION ENVIRONMENT | CPU CLOCK RATIO |
|---|---|
| ECU | 2 |
| SIMULATOR | 1 |

FIG. 12

SIMULATION DEVICE

TECHNICAL FIELD

The present invention relates to a simulation device having a function of matching an execution timing, and more particularly, to a simulation device used by a developer at the time of developing software for an electronic control unit (ECU) of a vehicle.

BACKGROUND ART

A general flow of the development of software for an electronic control unit (ECU) is to first design software on a personal computer (PC), confirm an operation in a PC environment (simulation environment), port software verified in the PC environment to an actual ECU environment, and then confirm an operation.

In this development flow, it often happens that a difference occurs in an operation result of application software between the PC environment and the actual ECU environment due to a hardware (HW) performance difference between the personal computer (PC) and the ECU.

Due to a difference in an execution timing of the application software between the PC environment and the actual ECU environment, a defect that occurs only in one of the PC environment and the actual ECU environment appears.

In order to improve a quality of software in an upstream process of software development where a PC simulator is used, it is important to make a processing timing in the PC simulation environment close to an actual ECU processing timing.

In relation to these points, Claim 2 of PTL 1 describes "A simulation of a clock interruption in which only a time when a simulation development environment actually uses a microprocessor unit of a development machine is measured is possible".

CITATION LIST

Patent Literature

PTL 1: JP H5-282160 A

SUMMARY OF INVENTION

Technical Problem

In PTL 1, a processing start timing by the clock interruption can be matched, but a processing timing after the processing start timing cannot be adjusted, and thus, a difference due to HW performance occurs.

For example, in a case of operating a plurality of applications on a multitask operating system, an update timing of a variable shared between tasks may differ between the simulation environment and the actual ECU environment. As a result, a timing of referring to the variable may change, which may cause a difference in an operation of the application software.

Therefore, an object of the present invention is to provide a simulation device having a function of adding delay processing for making an execution timing of a PC simulation environment close to that of an actual ECU.

Solution to Problem

According to the present invention, there is provided "a simulation device for converting application software into an execution code, verifying the execution code, and porting the verified execution code to another computer device, wherein the simulation device adjusts an execution timing in the other computer device by performing time adjustment processing at the time of starting or ending a function in function units of a source code of an application".

Advantageous Effects of Invention

By injecting delay processing in function call units, it is possible to make an execution timing close to an actual ECU in fine processing units in a PC simulation environment.

DESCRIPTION OF EMBODIMENTS

Hereinafter, embodiments of the present invention will be described with reference to the drawings.

Note that in the following description, a hardware configuration and main processing functions of a personal computer (PC) constituting a simulation device will be described before describing embodiments of the present invention. In addition, a generation process until software to be ported to an electronic control unit (ECU) is created using the simulation device will be described.

First, a hardware configuration and main processing functions of a personal computer (PC) constituting a simulation device will be described with reference to FIG. 1.

Figure 1:
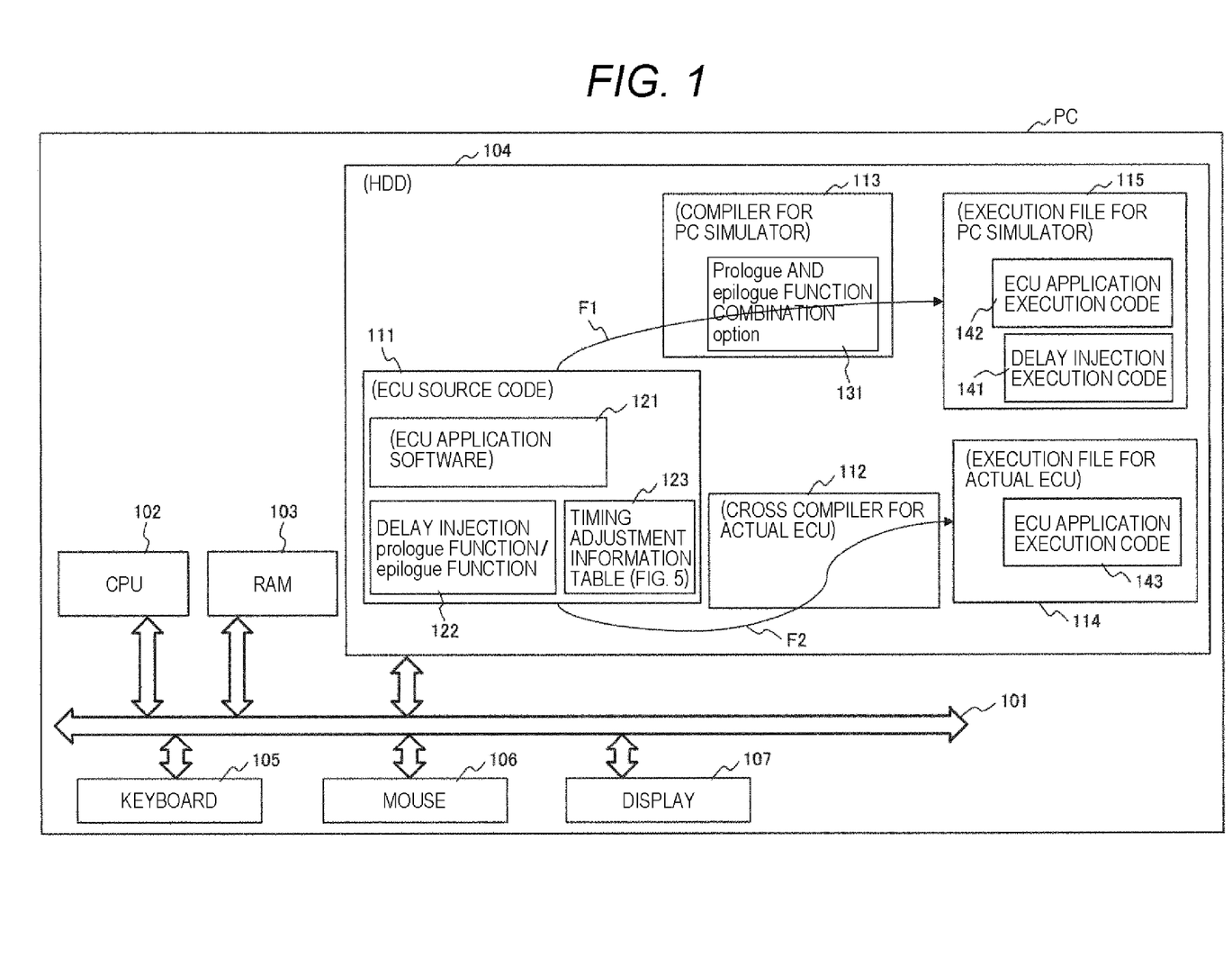
FIG. 1 is a diagram illustrating a hardware configuration and main processing functions of a personal computer (PC) constituting a simulation device.

A simulation device of FIG. 1 is constituted by a general personal computer (PC), and as a hardware configuration of the simulation device, a central processing unit (CPU) 102, a main storage device (random access memory (RAM)) 103, a hard disk drive (HDD) 104, a keyboard 105, a mouse 106, a display 107, and the like, are connected to a system bus 101 of the personal computer (PC).

In addition, when the simulation device of FIG. 1 is expressed in terms of processing functions, the simulation device can be expressed as various functions or products formed in the hard disk drive 104. Specifically, an ECU source code 111 for ECU application software, a cross compiler 112 for generating an execution file for an actual ECU, a compiler 113 for generating an execution file for PC simulation, an execution file 114 for an actual ECU generated by building the ECU source code 111 for ECU application software using the cross compiler 112, and an execution file 115 for a PC simulator generated by building the ECU source code 111 for ECU application software using the compiler 113 are held or formed in the hard disk drive 104.

According to FIG. 1, there are a processing flow F1 for forming the execution file 115 for a PC simulator from the source code 111 for ECU application software and a processing flow F2 for forming the execution file 114 for an actual ECU from the source code 111 for ECU application software, but these processing flows F1 and F2 are executed by a procedure illustrated in FIG. 2 and described later.

Note that the ECU source code 111 has an ECU application software 121 that operates on both the actual ECU and the PC simulator, a delay injection function 122 that operates only on a PC simulator environment, and a timing adjustment information table 123 that operates only in the PC simulator environment.

In addition, the compiler 113 for a PC simulator has a compile option 131 for hooking call processing of the delay injection function into the ECU application software. When the ECU source code 111 is compiled by designating the compile option 131 with the compiler 113, a delay injection execution code 141 is included in the execution file 115 for a PC simulator.

Note that an ECU application execution code 142 and the delay injection execution code 141 are generated and stored in the execution file 115 for a PC simulator by compile processing in the processing flow F1 and an ECU application execution code 143 is generated and stored in the execution file 114 for an actual ECU by compile processing in the processing flow F2.

It should be understood that a configuration and processing described here are described as an example and it is not intended to limit the technical scope of the present invention to this example.

Figure 2:
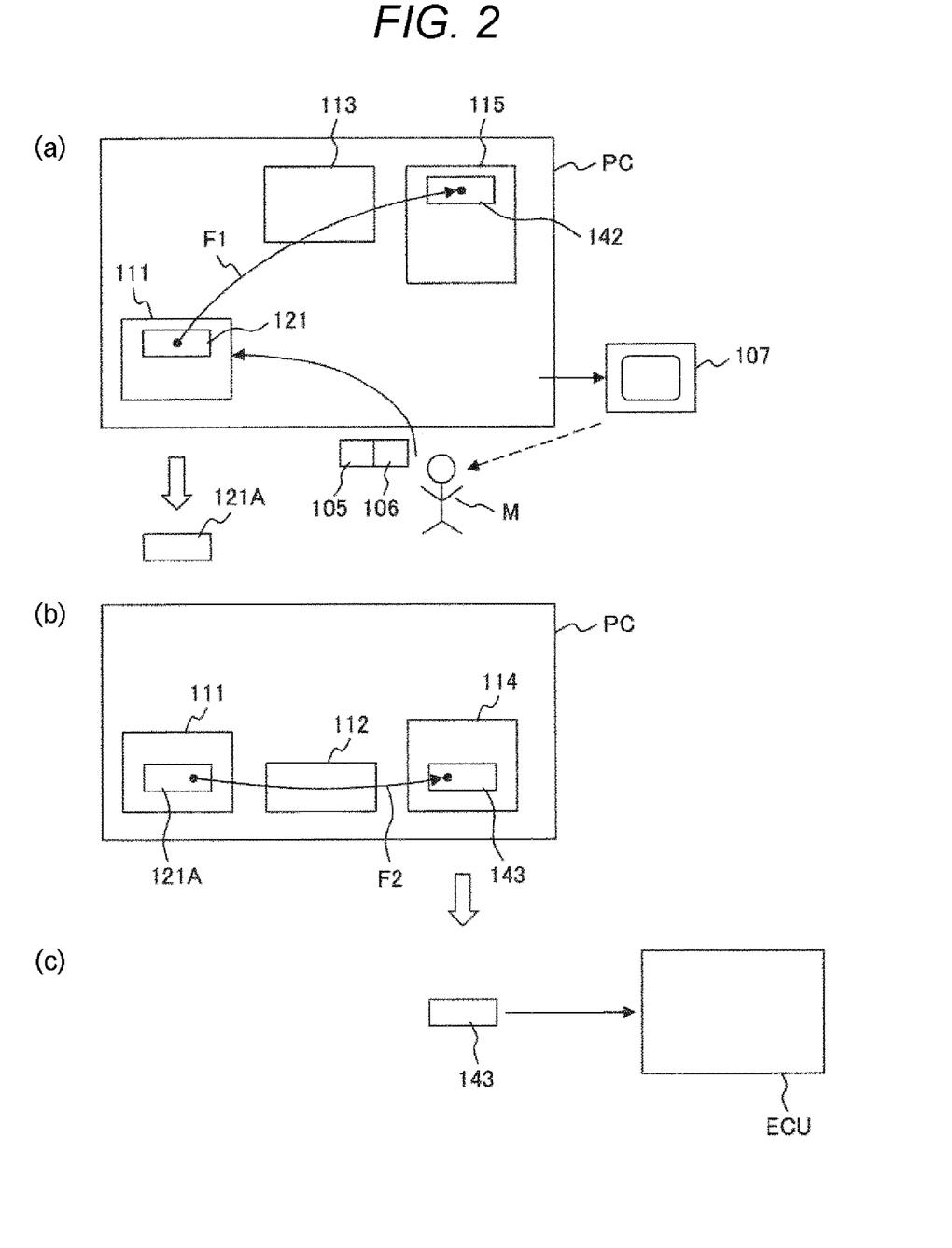
FIG. 2 is a diagram illustrating a generation process until software to be ported to an electronic control unit (ECU) is created using the simulation device.

FIG. 2 is a diagram illustrating a conventional generation process until software to be ported to an ECU is created using the simulation device.

(a) of FIG. 2 illustrates a first stage of application development, in which, for example, the ECU application software 121 for a brake operation in the ECU is converted by the compiler 113 for a PC simulator, such that the ECU application execution code 142 is generated in the execution file 115 for a PC simulator. This processing flow is illustrated by the processing flow F1.

In addition, in this stage, various simulations using the ECU application execution code 142 are executed in the personal computer (PC), and a result of the simulation is appropriately displayed on the display 107 or the like. A designer M receives the result of the simulation displayed on the display 107, appropriately modifies the ECU application software 121 using input means such as the mouse 106 and the keyboard 105, and finally obtains an application software 121A. In addition, the designer finally obtains an ECU application execution file code 142A (not illustrated).

(b) of FIG. 2 illustrates a second stage of the application development, in which the ECU application software 121A finally generated in the first stage of the application development is converted by the cross compiler 112 for an actual ECU, such that the ECU application execution code 143 is generated in the execution file 114 for an actual ECU. This processing flow is illustrated by the processing flow F2.

(c) of FIG. 2 illustrates an ECU confirmation stage, in which the ECU application execution code 143 finally obtained in the second stage of the application development is ported to the ECU and various inspections or the like by an actual machine are executed.

The above procedure illustrated in FIG. 2 illustrates the conventional generation process until the software to be ported to the ECU is created using the simulation device. However, in this case, there was a problem that a difference occurs in an operation result of the application software between a personal computer (PC) environment and an ECU environment due to a HW performance difference (hardware performance difference) between the personal computer (PC), which is a first computer constituting the simulation device, and a second computer constituting the ECU.

Note that as the HW performance difference between the first computer and the second computer, a difference in a clock frequency will be described by way of example in the following example. Note that in a first embodiment, a clock frequency fe of the ECU is 1000 Hz, a clock frequency fp of the personal computer (PC) is 3000 Hz, and a case where the personal computer (PC) has higher performance than the ECU is shown. In addition, in a second embodiment, a case where the ECU has higher performance than the personal computer (PC) is shown.

First Embodiment

Figure 3:
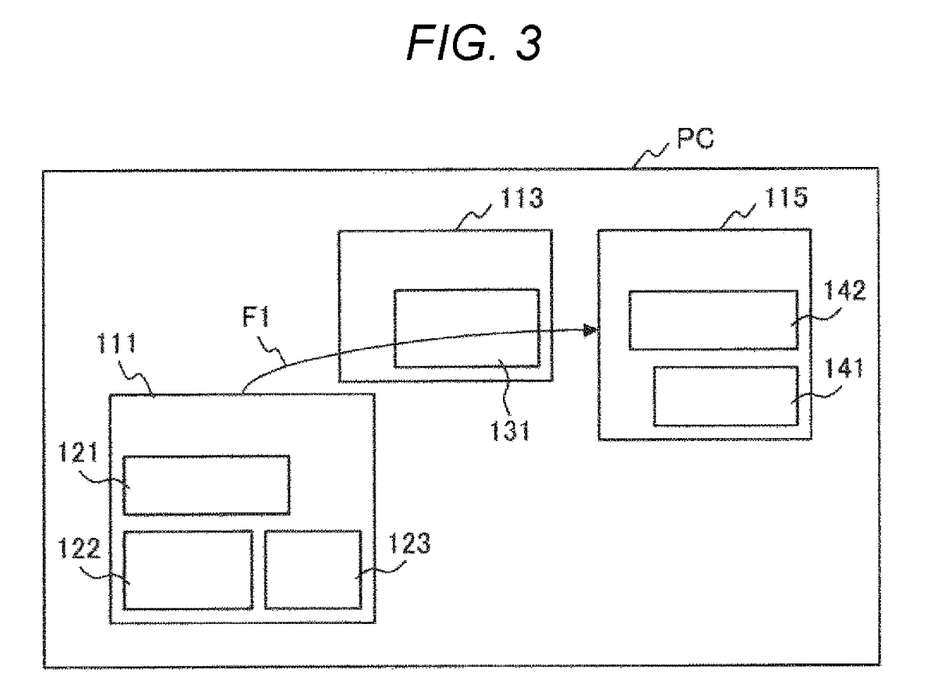
FIG. 3 is a diagram illustrating processing related to a first stage of application development according to a first embodiment of the present invention.

A first embodiment of the present invention is to improve the processing related to the first stage of the application development of (a) of FIG. 2. FIG. 3 illustrates processing related to a first stage of application development according to a first embodiment of the present invention.

In the first stage of the application development of FIG. 3, the following functions or processing are further added to the first stage of the application development of (a) of FIG. 2. These are the delay injection function 122 and the timing adjustment information table 123 added to the ECU source code 111, the compile option (function combination option) 131 added to the compiler 113 for a PC simulator, and the delay injection execution code 141 added to the execution file 115 for a PC simulator.

Note that according to a configuration of FIG. 3, execution timing adjustment processing can be attached or detached depending on whether or not the compile option is designated.

These added functions are to, in short, "set a predetermined delay time at a predetermined timing" in a finally formed program (the ECU application execution code 142 generated in the execution file 115 for a PC simulator) For this reason, it is preferable to adopt C language, C++ language, or JAVA (registered trademark) as a programming language in a computer of the present invention. Note that these languages will hereinafter be simply referred to as C language.

Figure 4:
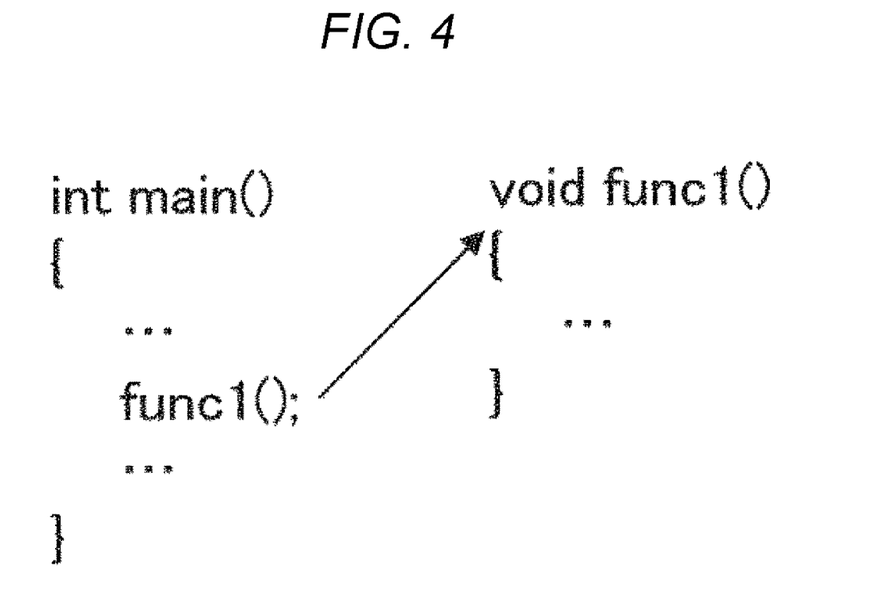
FIG. 4 is a diagram illustrating an example of a C language program used in the present invention.

FIG. 4 is a diagram illustrating an example of a C language program used in the present invention. The C language program is a simple program that calls a func1 function in a Main function as illustrated in FIG. 4 and executes the rest of the Main function after the func function ends. Note that in the Main function, a plurality of func functions can be called to perform processing. Note that the Main function may be referred to as a parent function and the func1 function may be referred to as a child function.

The delay injection function 122 added to the ECU source code 111 of FIG. 1 is a function for performing a function of "setting a predetermined delay time at a predetermined timing" in the func1 function of C language, a prologue function is used to set the delay time at a prologue position of the program, and an epilogue function is used to set the delay time at an epilogue of the program.

Note that the ECU is a so-called control computer incorporated and used in a vehicle. For this reason, for example, a single task ECU is activated at a cycle of 10 ms, and is operated so that a series of processing described in the Main function is completed within this period with a margin each time the single task ECU is started. Therefore, the personal computer (PC), which is the simulation device, is also configured and operated on the assumption that it is also treated as a control computer. Note that a multitask ECU has, for example, a control cycle of a separate system activated at a cycle of 5 ms, and is operated in an appropriate priority order.

Figure 5:
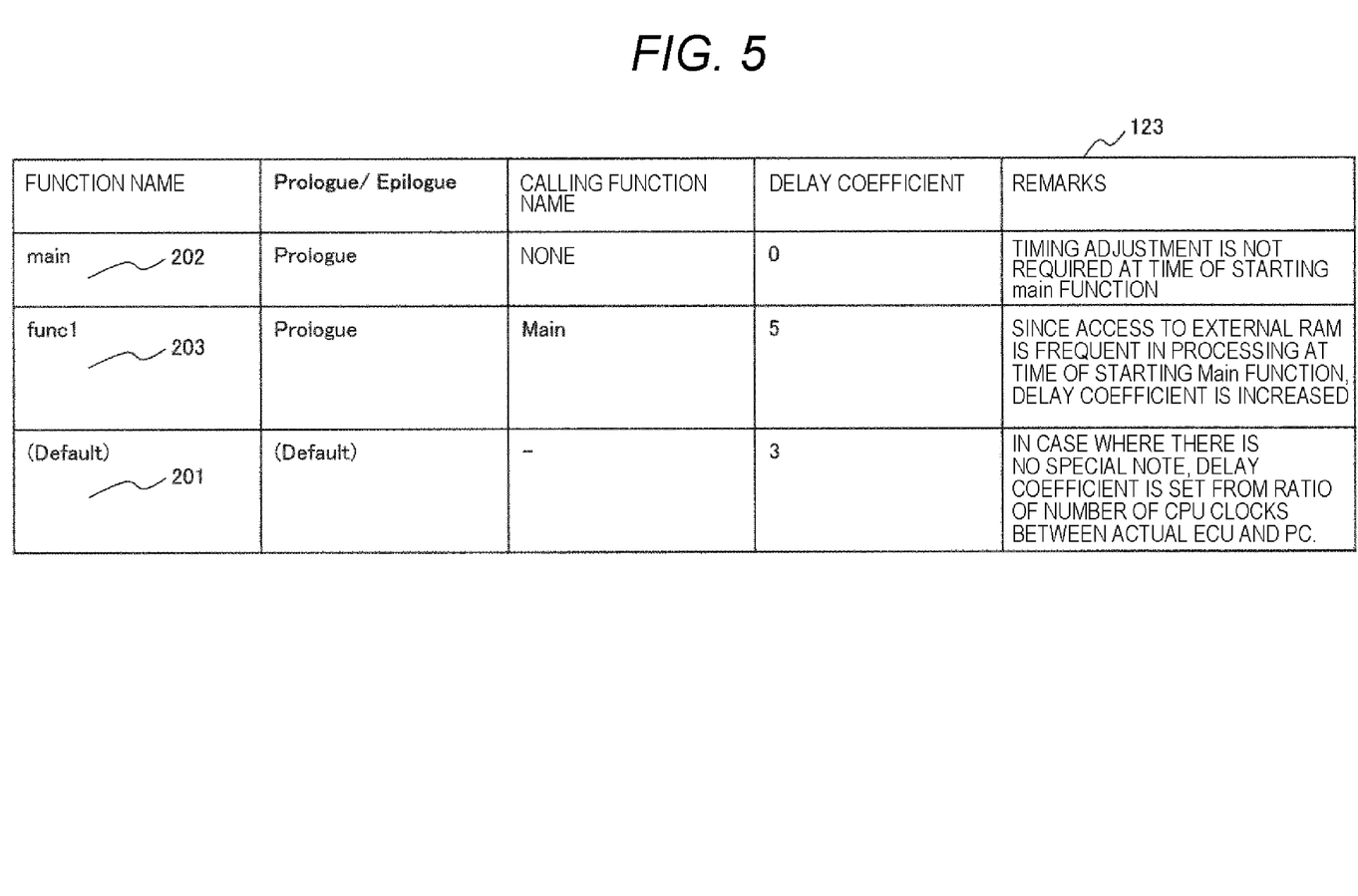
FIG. 5 is a diagram illustrating a table setting example of a timing adjustment information table 123.

FIG. 5 illustrates a table setting example in the present embodiment of the timing adjustment information table 123 defined in FIG. 1. Here, a distinction of delay time setting positions, a calling function name, a delay coefficient (delay time), requirements as remarks, and the like, are described with respect to a Main function, a func function, and a Default.

For example, in line 201 for the Default, delay coefficient 3 is set as a default setting in the present example. In the Default, in a case where there is no special note, the delay coefficient is set from a ratio of the number of CPU clocks between the actual ECU and the PC.

In line 202 for the Main function, 0 is set as a delay coefficient executed by a Prologue function (processing by this function is hereinafter referred to as prologue processing) of the Main function. Note that the reason for setting 0 as the delay coefficient is that timing adjustment is not required at the time of starting execution of the Main function.

In line 203 for the func function, 5 is set as a timing adjustment coefficient in a Prologue function of a func function. Exceptionally, in a case where it is necessary to set a timing adjustment time to a value other than a default value, such individual setting is performed. Note that in this example, since an access to an external random access memory (RAM) is frequent in processing at the time of starting the main function, a delay coefficient for the func1 function is increased.

Note that the Default means that standard setting is performed for parts that are not defined by the Main function, the func1 function or the like. For example, in line 202 for the Main function, 0 is set as the delay coefficient executed by the Prologue function of the Main function, but the delay coefficient is not set for an Epilogue function (processing by this function is hereinafter referred to as epilogue processing).

In this case, the meaning that the delay coefficient is not set is that 3 is set as the delay coefficient according to setting in the Default.

Figure 6:
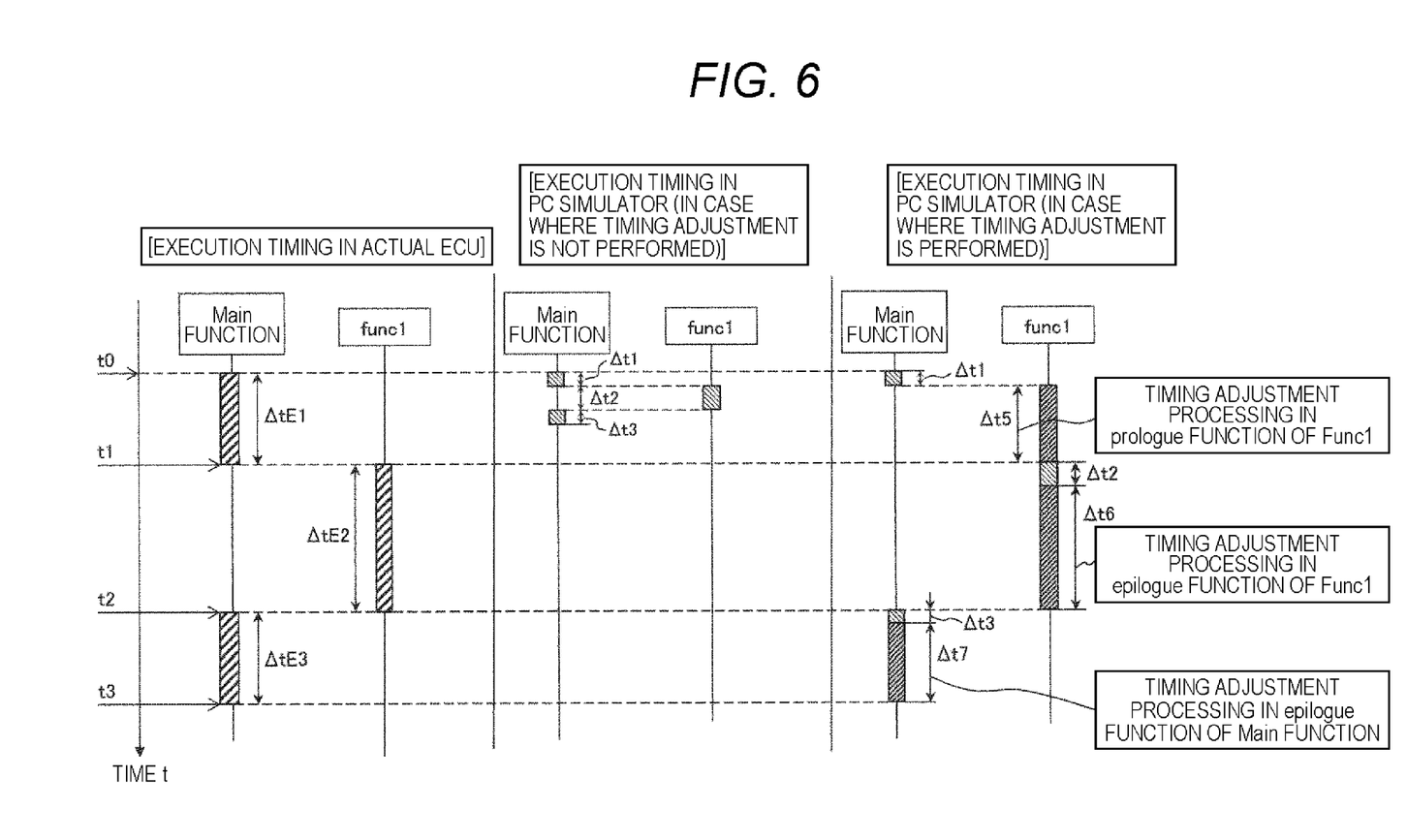
FIG. 6 is a diagram illustrating execution timing examples in an actual ECU and in a simulator in a case where timing adjustment is not performed and in a case where a timing adjustment is performed.

FIG. 6 illustrates examples of an execution timing in the actual ECU, an execution timing in the PC simulator in a case where timing adjustment is not performed, and an execution timing in the PC simulator in a case where timing adjustment is performed.

First, an execution timing in the ECU on a left side of FIG. 6 will be described. As described above, this timing processing is a timing in a case where it is executed at a control cycle of 10 ms and a clock frequency of 1000 Hz of the ECU.

Here, it is assumed that the control cycle of 10 ms is started at time t0.

In this example, a program requires a time of $\Delta tE1$ for pre-processing of the Main function, a time of $\Delta tE2$ for processing of the func function, and a time of $\Delta tE3$ for post-processing of the Main function, and this total time is completed with a sufficient margin within the control cycle of 10 ms of the ECU. Note that a pre-processing completion time of the Main function is denoted by t1, a processing completion time of the func1 function is denoted by t2, and a post-processing completion time of the Main function is denoted by t3.

On the other hand, it is desirable that the same timing as the execution timing in the ECU can be realized inside the simulation device using the personal computer (PC).

Regarding this point, according to a conventional manner (center of FIG. 6) that does not execute the timing adjustment illustrated in FIG. 2, an execution start point in time is the same time t0 in both the actual ECU and the PC simulation environment, but a clock frequency of the personal computer (PC) may be 3000 Hz, such that a series of processing is completed in a short time. Specifically, a time of $\Delta t1$ is required for pre-processing of the Main function, a time of $\Delta t2$ is required for processing of the func function, and a time of $\Delta t3$ is required for post-processing of the Main function, but since these times are sufficiently earlier than each time of the actual ECU, the execution timing is completely different from an execution timing of the actual ECU.

Thus, in the present invention, by appropriately setting the delay time before and after the function, it is possible to realize a timing close to an execution timing in the ECU on the left side of FIG. 6. Note that in a case where timing adjustment is performed on a right side of FIG. 6, a start point in time of the control cycle is t0, similar to the other cases.

At this time, the program starts from the Main function. First, the prologue processing of the Main function of line 202 is executed by referring to the timing adjustment information table 123 of FIG. 5, but in the timing adjustment information table 123 of FIG. 5, the delay time of the prologue processing of the main function is 0, and the processing of the Main function is thus started without delay. When the main function is executed, the func1 function is called after a time of $\Delta t1$.

Next, the program executes prologue processing of the func1 function in line 203 by referring to the timing adjustment information table 123 of FIG. 5, but here, 5 is set as the delay coefficient, and the processing of the func1 function is thus executed after a delay time $\Delta t5$ has elapsed. Therefore, a processing start time of the func function can be matched with a processing start time t1 of the func1 function in the ECU.

An execution time of the func1 function is $\Delta t2$, which is the same as that of the case where the timing adjustment is performed. Note that delay coefficient 3 is set as epilogue adjustment processing of the func1 function by the setting in the Default function, and a post-processing start time of the main function can be matched with the processing start time t2 of the main function in the ECU by setting a delay time Δt6 determined by delay coefficient 3.

Similarly, delay coefficient 3 is set as epilogue adjustment processing of the main function by the setting in the Default function, and a post-processing end time of the main function can be matched with the post-processing end time t3 of the main function in the ECU by setting a delay time Δt7 determined by delay coefficient 3.

Note that in the timing adjustment information table 123 of FIG. 5, the delay coefficient of the func1 function is 5. This indicates that the actual ECU takes the processing time five times, which means that a timing adjustment time in the prologue processing of the func1 function is a time of t×(5-1).

In addition, after waiting for a time in the prologue processing of the func1 function (after a time elapses in infinite loop processing or the like), the prologue processing of the func1 function ends, and actual processing of the func starts. By adjusting a timing in the prologue processing, an actual processing timing of the func1 function can be made close to a processing timing of the actual ECU.

A time taken from the end of the prologue processing of the func function to the start of the epilogue processing of the func1 function is Δt2. When viewing the timing adjustment information table 123 of FIG. 5, a delay coefficient of epilogue processing of the func1 function is 3. This delay coefficient is set in that the actual ECU will take the time three times, and a timing adjustment time in the epilogue processing of the func1 function is a time of Δt2×(3-1).

After waiting for a time of 2×Δt2 in the epilogue processing of the func1 function, the epilogue processing of the func1 function, ends and processing of the Main function after execution of the func1 function starts. By adjusting a timing in the epilogue processing of the func1 function, an execution timing in the Main function after a func1 function call ends can be made closer to a processing timing in the actual ECU.

After executing the rest of the Main function, the epilogue processing of the main function is called.

In the timing adjustment information table 123 of FIG. 5, a delay coefficient of the epilogue processing of the main function is 3 of a default. A time from the execution of the epilogue processing of the func1 function to the start of the epilogue processing of the main function is Δt6. This indicates that the actual ECU takes the processing time three times, and a timing adjustment time in the epilogue processing of the main function is a time of Δt6×(3-1). After waiting for a time of 2×u in the epilogue processing of the main function, the Main function ends.

By adjusting a timing in the epilogue processing of the Main function, an end timing of the Main function can be made close to a processing timing of the actual ECU.

Figure 7:
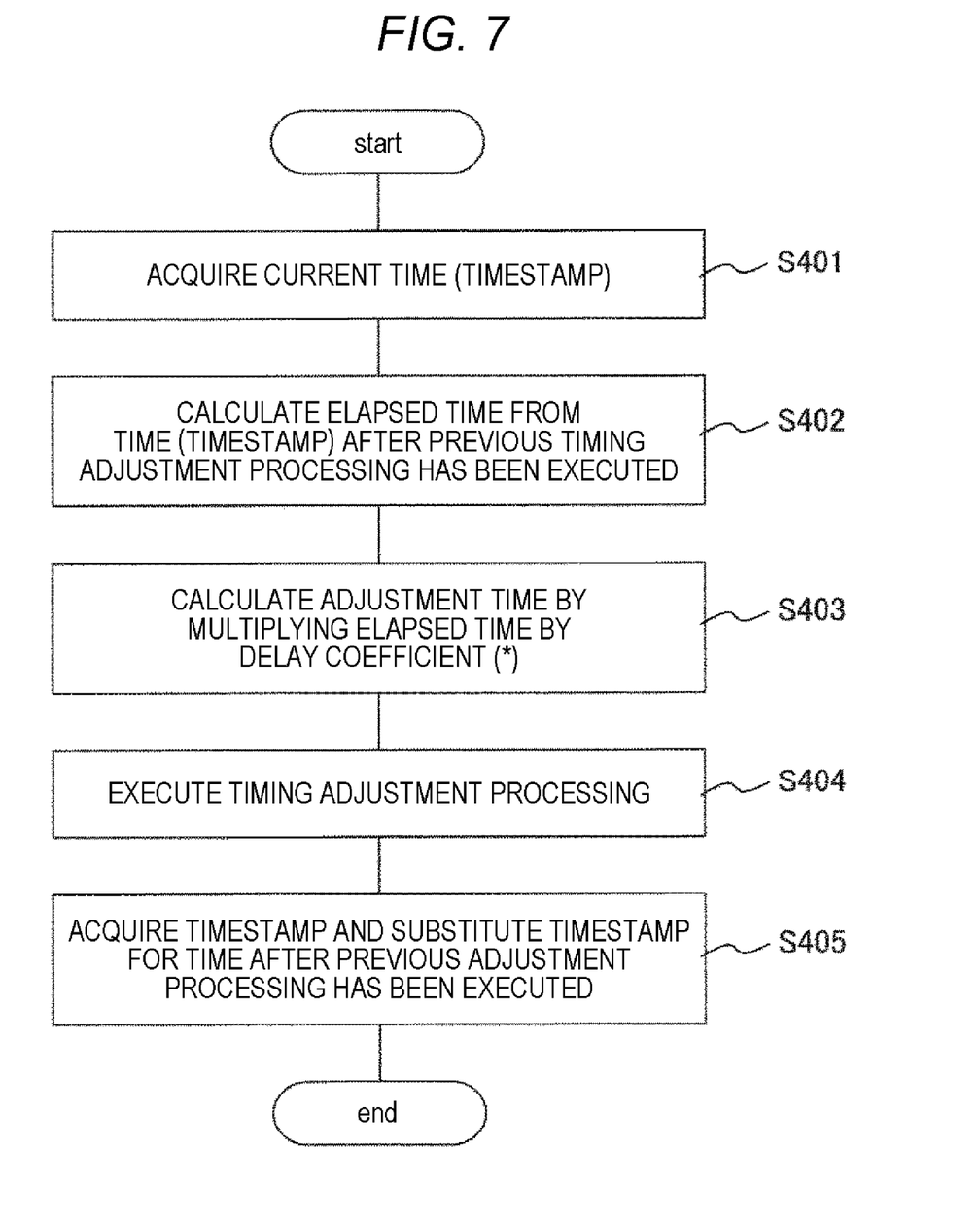
FIG. 7 is a diagram illustrating a flowchart of timing adjustment processing in the first embodiment.

FIG. 7 illustrates a flowchart of timing adjustment processing in the present example according to the first embodiment. According to a flow of FIG. 7, in first processing step S401, a current time is acquired at a start point in time of a prologue function or an epilogue function. Next, in processing step S402, an elapsed time from a time after the previous timing adjustment processing has been executed is calculated. A timing adjustment time is calculated in processing step S403 based on the elapsed time calculated in processing step S402 and the delay coefficient acquired from the timing adjustment information table illustrated in FIG. 5. Note that there are various methods such as a method of calculating the delay coefficient from a CPU performance ratio between the actual ECU and the PC, or the like. In processing step S404, timing adjustment processing by the timing adjustment time calculated in processing step S403 is executed. Finally, in processing step S405, a time after the timing adjustment is executed is acquired and stored as a time after the previous timing adjustment processing is executed.

Note that in setting the delay time in each function, it can be appropriately adopted whether or not the delay time is set in a time from an absolute time (for example, a start time of the control cycle) or is set in a time from an occurrence time of the previous event (for example, start and end times of each function).

As such, according to the present invention, a processing timing in the PC simulation environment can be used for the actual ECU by realizing a mechanism capable of implementing and adding delay processing that operates only in the PC simulation environment.

In addition, a place where the delay processing is put is "prologue processing called at the time of starting the function" or "epilogue processing called at the time of ending the function". It is possible to implement the delay processing in any one of the prologue processing and the epilogue processing or it is possible to put the delay processing in both of the prologue processing and the epilogue processing.

Further, the call processing of the delay injection function can be performed by adding the compile option. It is preferable to use a function capable of designating a function operating at the time of the prologue and the epilogue, such as a "-finstrument-functions" option of GCC. It is not necessary to add processing for calling a test code in application software for a test in the PC simulation environment.

As described above, the present invention is the simulation device for converting the application software into the execution code, verifying the execution code, and porting the verified execution code to another computer device, wherein the simulation device adjusts the execution timing in the other computer device by performing the time adjustment processing at the time of starting or ending the function in function units of the source code of the application.

Second Embodiment

In the first embodiment, the timing is matched with that of the ECU by setting the delay time before or after each function on the assumption that a processing speed of the ECU is slower than a processing speed of the personal computer. That is, the delay processing is performed as the time adjustment processing.

Figure 8:
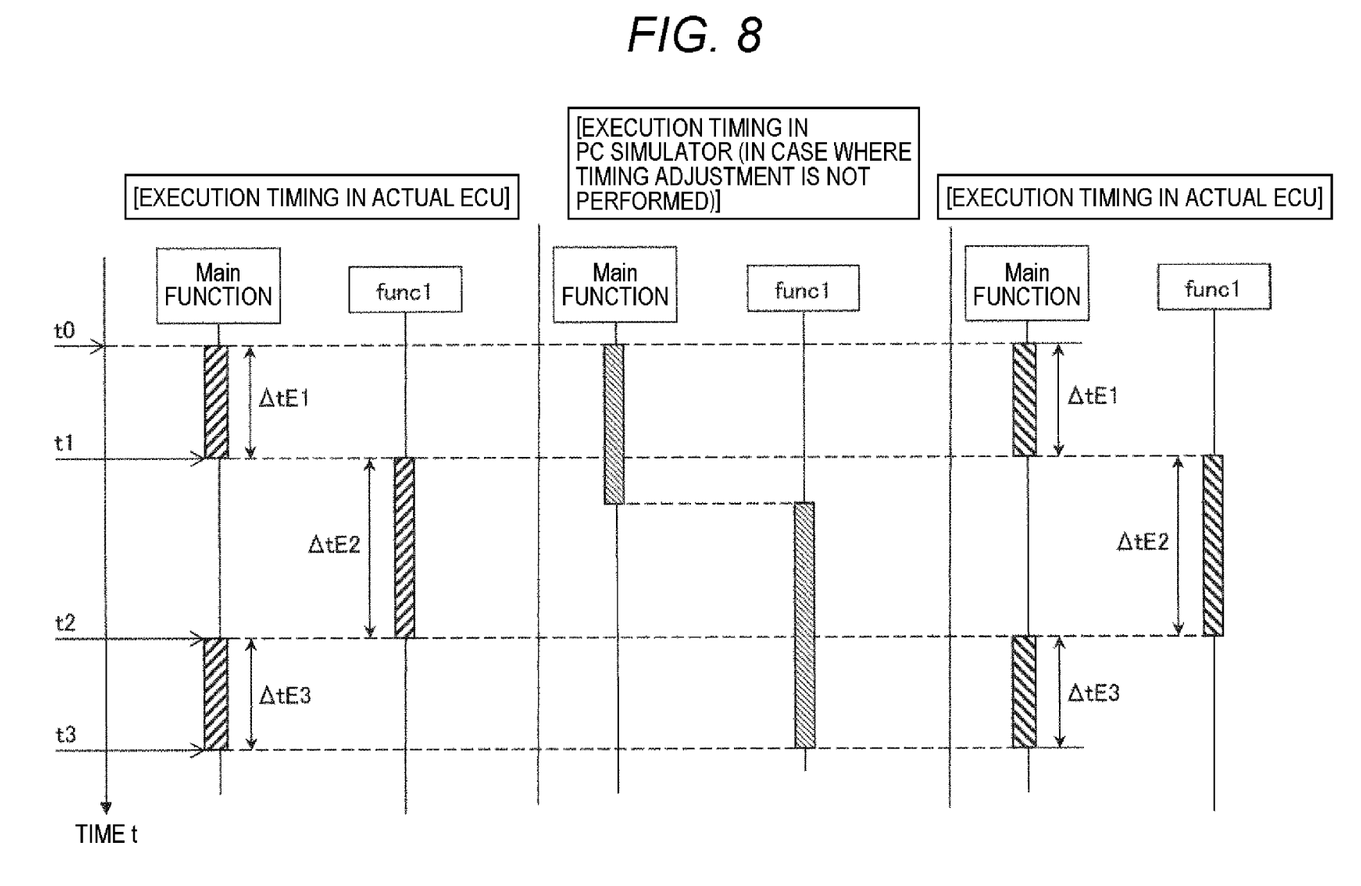
FIG. 8 is a diagram illustrating a timing example in a case where a processing speed of the ECU is faster than a processing speed of the personal computer.

On the other hand, the processing speed of the ECU may be faster than the processing speed of the personal computer. FIG. 8 is a diagram illustrating a timing example in a case where the processing speed of the ECU is faster than the processing speed of the personal computer. This illustrates correspondence in this case, and, for example, it is assumed that the ECU takes ΔtE1 for processing of a Main function, but the personal computer will take more time for processing of a Main function. In this case, it is preferable to adjust the processing time ΔtE1 in the ECU by multiplying the time required for processing the Main function in the personal computer by an appropriate coefficient. This is to perform time shortening processing as time adjustment processing.

Third Embodiment

Also in a third embodiment, a countermeasure in a case where the processing speed of the ECU is faster than the processing speed of the personal computer (PC) is assumed.

Figure 11:
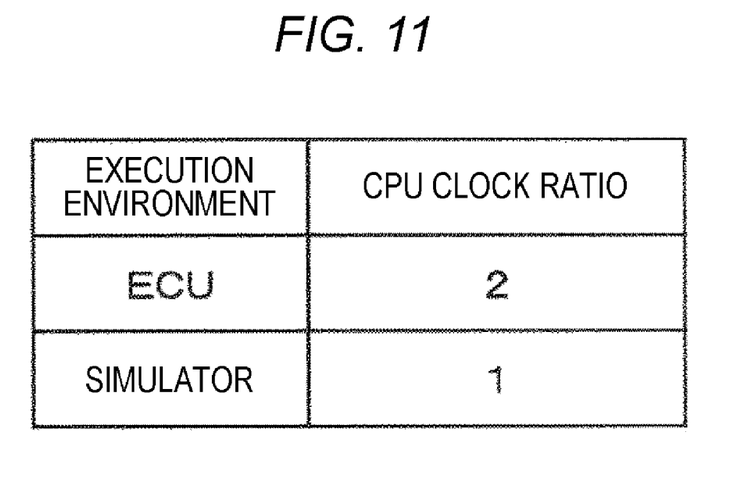
FIG. 11 is a diagram illustrating a ratio between the number of CPU clocks of the actual ECU and the number of clocks of the personal computer (PC) on which the simulator operates.

With respect to the third embodiment, an example of a case where a simulation is executed at a simulation speed lower than that of the actual ECU environment will be described with reference to FIGS. 11 and 12. An embodiment in a case of comparing the actual ECU and the personal computer (PC) on which the simulator operates with each other and applying a timing adjustment function when the actual ECU is faster than the PC will be described.

An embodiment of cyclically executing the main function illustrated in FIG. 4 will be described. FIG. 11 illustrates a ratio between the number of CPU clocks of the actual ECU and the number of clocks of the personal computer (PC) on which the simulator operates. In the present example, an environment in which performance of the actual ECU is twice as good as performance of the personal computer (PC) is used by way of example.

Figure 12:
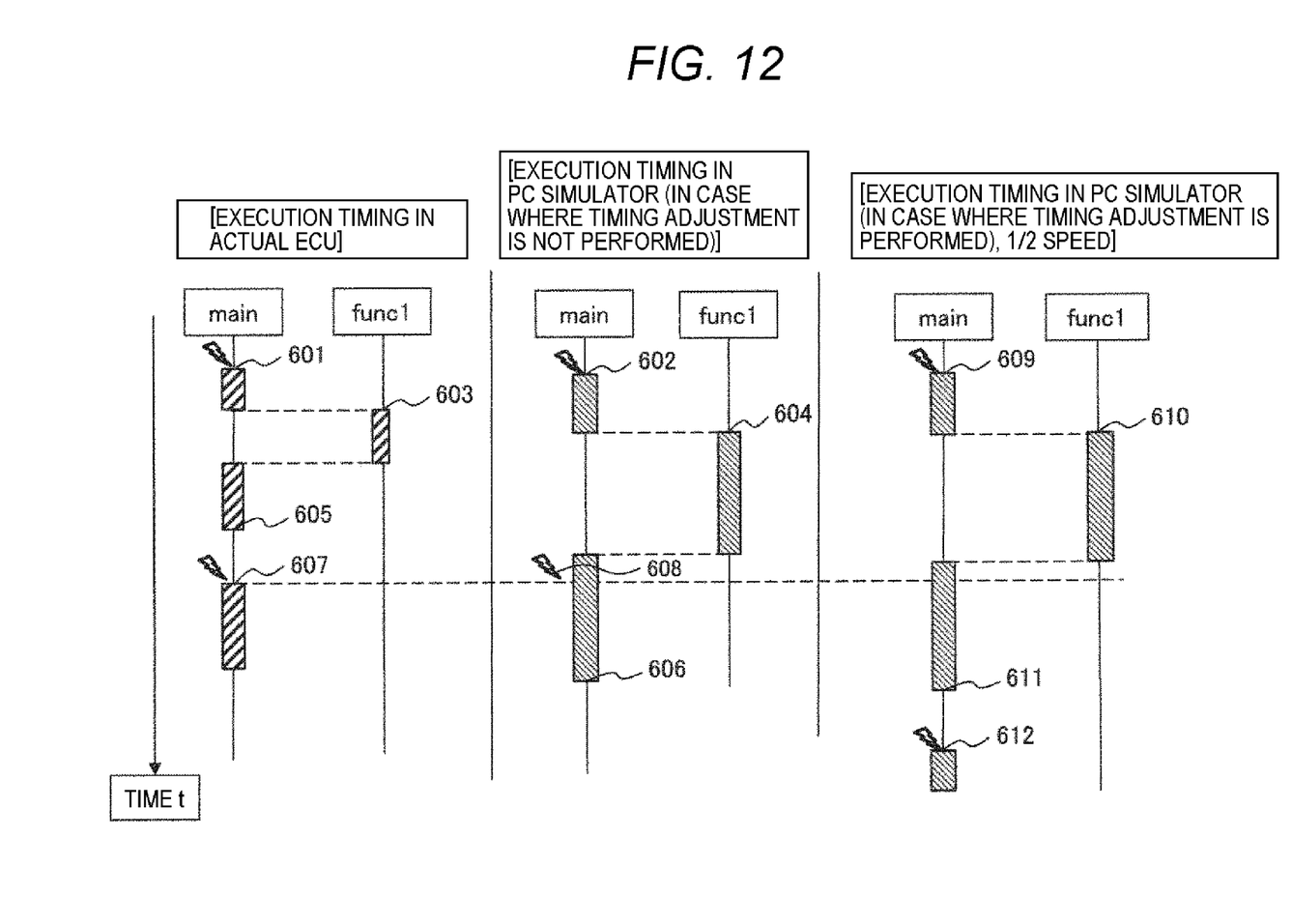
FIG. 12 is a diagram illustrating a processing timing in a case where processing is executed by the actual ECU and a processing timing in a case where processing is executed by a PC simulator.

FIG. 12 illustrates a processing timing in a case in which processing is executed by the actual ECU and a processing timing in a case where processing is executed by the PC simulator.

Cyclic processing timer events 601 and 602 occur, and cyclic processing starts by starting the main function. The func1 function is called from the Main function (603 and 604). After the Func function is executed, a process returns to the main function, and the cyclic processing is completed at a point in time when the main function ends (605 and 606). The next cyclic processing timer event is issued (607 and 608) and the next cyclic processing starts from the main function, but in a case of the present embodiment, it can be confirmed from the fact that timings of 606 and 608 are exchanged with each other, that the previous cyclic processing is not completed due to low CPU performance in the PC simulator environment.

In a case where processing is executed at a normal speed in the PC simulator environment, the processing cannot be executed at the same timing as the ECU. Therefore, by doubling a timer event occurrence interval in the PC simulation environment by halving a speed based on a CPU ratio, it becomes possible to execute the processing in a form in which the processing timing in the PC simulation is close to that of the actual ECU.

A right side of FIG. 12 illustrates a processing timing when processing is executed at a half speed in the PC simulation environment. The occurrence of a timer event 609, the start of execution of a func1 function 610, and the end of a main function 611 are the same as an execution timing at the time of normal speed reproduction in the PC simulation environment, but the next cyclic processing timer event occurrence timing 612 is twice after that at the time of normal speed reproduction, such that cyclic processing in the PC simulation environment can be kept within the cycle. Note that a correction method in the prologue/epilogue in a case where an execution time of the function on the PC is shorter than twice the execution time on the ECU is similar to that of the first embodiment.

A change of a cycle for generating the timer event is performed in the prologue processing or epilogue processing of the function executed in program initialization processing or the like.

As a variation of the present embodiment, a manner of providing a virtual time instead of a real time on the PC, and correcting the virtual time to a time arriving at the virtual time in the ECU, in the prologue/epilogue is also possible. In this manner, the virtual time is corrected instead of inserting the wait, and a simulation time can thus be reduced.

Fourth Embodiment

In the first to third embodiments, the embodiments in a case where the timing adjustment function is applied to a program (so-called single task) in which only one task operates on one CPU have been described. On the other hand, in a multitask-type ECU, the timing adjustment function needs to be applied to a program in which a plurality of tasks A and B operate on one CPU.

In such a multitask manner, a processing request for another task with a high priority is input during execution of one task, and switching processing such as interrupting the one task, performing processing of the other task, and executing the remaining part of the one task again after the processing ends occurs.

Figure 9:
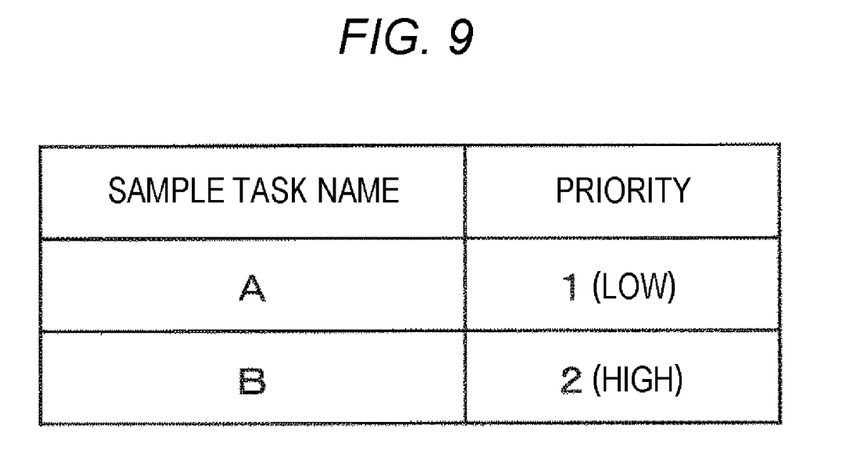
FIG. 9 is a diagram illustrating a relationship between task priorities of task A and task B.

FIG. 9 illustrates a relationship between task priorities of task A and task B. A case where the task A is activated at a control cycle of 10 ms, the task B is activated at a control cycle of 5 ms, and the task B has a high priority is illustrated.

Figure 10:
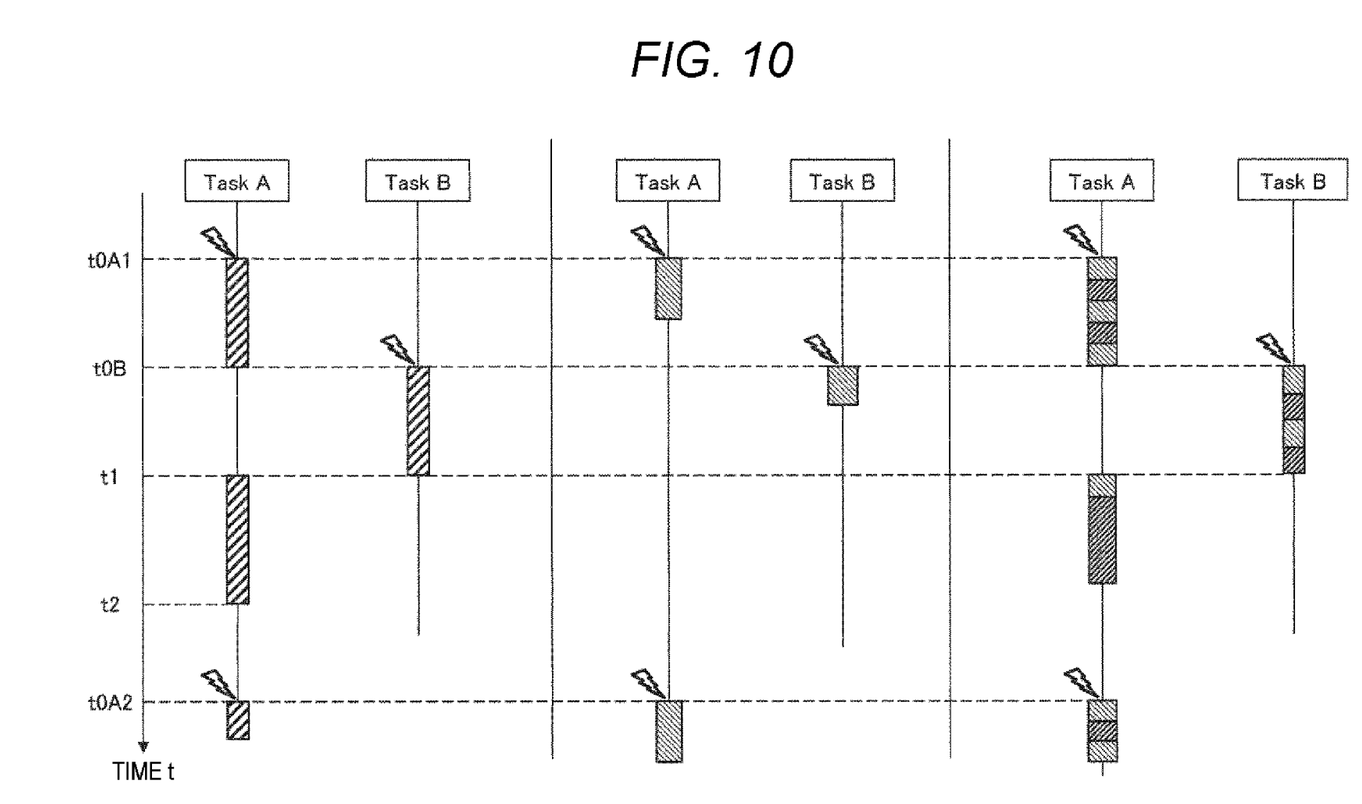
FIG. 10 is a diagram illustrating a concept of timing adjustment in a case of interruption processing in a multi-task.

FIG. 10 illustrates a concept of timing adjustment in a case of interruption processing in a multitask. A left side of FIG. 10 illustrates actual processing in the ECU, and task A and task B are executed under different control cycles. Here, a cyclic processing timer activation time of the task A is indicated by t0A1 and t0A2, and a cyclic processing timer activation time of the task B is indicated by t0B. In addition, in this example, a period between times t0A1 and t0A2 is a control cycle of the task A and it is illustrated that a restart time of the task A has become t1 and an end time of task A has become t2, due to interruption processing of the task B.

In this example of FIG. 10, the task A starts processing triggered by a timer event at time t0A1. Thereafter, a timer event of the task B is issued at time t0B during the execution of the processing of the task A. At this time, the execution of the task A is interrupted and processing of the task B is started, from a relationship of a priority.

According to an event generation timing of the present example, in the actual ECU, the execution processing of the task A does not end until the start of the task B, and switching to the task B occurs. After the processing of the task B ends, the execution of the task A restarts.

On the other hand, according to conventional processing of the center of FIG. 10, since the PC simulator environment is faster than the ECU, the execution of the task A ends until the start of task B, and thus, task switching does not occur. That is, in the conventional manner, the task switching in the multitask cannot be reproduced. As a result, even though it can be executed at one cycle in the PC simulator environment and is operating correctly, in a case where it is ported to the actual ECU environment and an operation is confirmed, a problem that the processing is not completed within a period of one cycle frequently occurs.

An operation of the present invention in a case where the timing adjustment is put by the prologue and epilogue processing of the function in the PC simulation environment is described on a right side of FIG. 10. According to this description example, by adding an appropriate delay time, it is possible to form a pre-processing portion of the task A, and similarly, it is possible to form post-processing portions of the task B and the task A, such that it is possible to realize the interruption processing.

As such, since the timing adjustment processing is finely performed in function units, similar to the first embodiment, in a case where the timer events of the task A and the task B occur at the same timing in the actual ECU and the PC simulator, the task switching occurs on the PC simulator. That is, in a case of a multitask manner that operates at a different control cycle, the simulation device can perform the time adjustment processing and reproduce the interruption processing, for each of a plurality of tasks.

Note that in the multitask manner, it is preferable that the execution time stored in order to adjust the timing be managed for each task and processing for stopping count-up of an execution time of the task whose resources have been deprived by the timing adjustment processing after the task is switched be executed.

In the present example, the execution of the task A is stopped in the prologue function at the time of starting cyclic processing of the task B. Processing time count of the task A is stopped in the prologue function at the time of starting the task B, and execution time count-up of the task A is restarted in the epilogue function at the time of ending the processing of the task B. Thereafter, at the timing adjustment timing, a timing adjustment time is calculated from an execution time before the resources are deprived by the task B and after recovery, and timing adjustment is performed.

REFERENCE SIGNS LIST 101 system bus
102 CPU
103 main storage device (RAM)
104 hard disk drive (HDD)
105 keyboard
106 mouse
107 display
111 ECU source code
112 cross compiler
113 compiler
114 execution file for actual ECU
115 execution file for PC simulator
121 ECU application software
122 delay injection function
123 timing adjustment information table
131 compile option
141 delay injection execution code
142, 143 ECU application execution code
F1, F2 processing flow

The invention claimed is:

1. A simulation device, wherein the simulation device is a first computer device, configured to:
convert application software into an execution code;
verify the execution code; and
port the verified execution code to a second computer device,
wherein the simulation device adjusts an execution timing in the second computer device by performing time adjustment processing at the time of starting or ending a function in function units of a source code of an application, and
wherein, in a case where a processing speed of the simulation device is slower than a processing speed of the second computer device, calculation of a delay coefficient based on a speed ratio between the simulation device and the second computer device and adjustment of the processing speed of the simulation device based on the delay coefficient is performed as the time adjustment processing.

2. The simulation device according to claim 1, wherein any one of C language, C++ language, and JAVA is adopted as a programming language making the time adjustment processing possible.

3. The simulation device according to claim 1, wherein in a case where a processing speed of the simulation device is faster than a processing speed of the second computer device, delay processing is performed as the time adjustment processing.

4. The simulation device according to claim 1, wherein in a case where a processing speed of the simulation device is slower than a processing speed of the second computer device, time shortening processing is performed as the time adjustment processing.

5. The simulation device according to claim 1, wherein the second computer device is a multitask-type computer device which operates at a different control cycle, and the simulation device performs the time adjustment processing and reproduces interruption processing for each of a plurality of tasks.

6. The simulation device according to claim 1, wherein execution timing adjustment processing is attachable or detachable depending on whether or not a compile option is designated.

7. A simulation device, wherein the simulation device is a first computer device, configured to:
convert application software into an execution code;
verify the execution code; and
port the verified execution code to a second computer device,
wherein the simulation device adjusts an execution timing in the second computer device by performing time adjustment processing at the time of starting or ending a function in function units of a source code of an application, and
wherein the time adjustment processing includes:
calculating a delay coefficient based on a speed ratio between the simulation device and the second computer device; and
adjusting the processing speed of the simulation device based on the delay coefficient.

* * * * *